United States Patent
Zhang et al.

(10) Patent No.: US 12,450,092 B2
(45) Date of Patent: Oct. 21, 2025

(54) TASK SCHEDULING METHOD BASED ON IMPROVED PARTICLE SWARM OPTIMIZATION ALGORITHM

(71) Applicant: NANJING UNIVERSITY OF POSTS AND TELECOMMUNICATIONS, Nanjing (CN)

(72) Inventors: Dengyin Zhang, Nanjing (CN); Maomao Ji, Nanjing (CN); Ying Zhao, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 432 days.

(21) Appl. No.: 18/320,934

(22) Filed: May 19, 2023

(65) Prior Publication Data
US 2024/0126597 A1    Apr. 18, 2024

Related U.S. Application Data

(63) Continuation of application No. PCT/CN2023/086264, filed on Apr. 4, 2023.

(30) Foreign Application Priority Data

Oct. 7, 2022    (CN) .......................... 202211218829.X

(51) Int. Cl.
*G06F 9/48*    (2006.01)
(52) U.S. Cl.
CPC ................... *G06F 9/4881* (2013.01)
(58) Field of Classification Search
None
See application file for complete search history.

(56) References Cited

U.S. PATENT DOCUMENTS 8,875,143 B2 * 10/2014 Piazza ...................... G06F 9/46
  718/102
11,188,382 B2 * 11/2021 Zhang ................... G06F 9/4881
(Continued)

FOREIGN PATENT DOCUMENTS

CN    103870317 A  *  6/2014   ........... G06F 9/5066
CN    104361393 A      2/2015
(Continued)

OTHER PUBLICATIONS

Xiaodong et al. "Particle Swarm Optimization and Cuckoo Search Paralleled Algorithm", 2017 IEEE, pp. 2236-2240.*
(Continued)

*Primary Examiner* — Van H Nguyen
(74) *Attorney, Agent, or Firm* — Nitin Kaushik

(57) ABSTRACT

The present application discloses a task scheduling method based on an improved particle swarm optimization algorithm, which includes: obtaining task data to be scheduled, encoding particles according to the task data; iterating the particles by a particle swarm optimization algorithm; in response to that the particle swarm optimization algorithm does not fall into a local optimal solution, outputting a scheduling scheme; and in response to that the particle swarm optimization algorithm falls into the local optimal solution, outputting the scheduling scheme by fusing the particle swarm optimization algorithm with a cuckoo search algorithm. The present application introduces a cuckoo search algorithm when the particle swarm optimization algorithm falls into a local optimal solution, solving the dilemma of the particle swarm optimization algorithm falling into a local optimal solution, while improving the global search capability of the algorithm.

4 Claims, 3 Drawing Sheets

(56) References Cited

U.S. PATENT DOCUMENTS

| | | | | |
|---|---|---|---|---|
| 11,620,157 B2* | 4/2023 | Sriharsha | ............... | G06F 9/544 |
| | | | | 714/25 |
| 2020/0019435 A1* | 1/2020 | Stevenson | .............. | G06N 3/006 |
| 2022/0263313 A1* | 8/2022 | Locher | ..................... | H02J 3/28 |

FOREIGN PATENT DOCUMENTS

| | | | | | |
|---|---|---|---|---|---|
| CN | 105975342 A | * | 9/2016 | ........... | G06F 9/4881 |
| CN | 106326188 A | | 1/2017 | | |
| CN | 106970840 A | * | 7/2017 | ........... | G06F 9/4881 |
| CN | 109062657 A | * | 12/2018 | ........... | G06F 9/4881 |
| CN | 109376012 A | * | 2/2019 | ............ | G06N 3/045 |
| CN | 115454611 A | | 12/2022 | | |
| WO | WO-2014090037 A1 | * | 6/2014 | ........... | G06F 9/4881 |

OTHER PUBLICATIONS

Tchapda et al. "Improved Particle Swarm Optimization Based on Cuckoo Search Operations and Its Application", 2017 IEEE, pp. 290-294.*

Mellal et al. "Availability Optimization of Parallel-Series System by Evolutionary Computation", 2018 IEEE, pp. 198-202.*

Junliang et al. "Particle Swarm Algorithm Based Task Scheduling for Many-Core Systems", 2017 IEEE, pp. 1860-1864.*

* cited by examiner

TASK SCHEDULING METHOD BASED ON IMPROVED PARTICLE SWARM OPTIMIZATION ALGORITHM

CROSS-REFERENCE TO RELATED APPLICATIONS

This application is the National Stage of International Application No. PCT/CN2023/086264, filed on Apr. 4, 2023, which claims priority to Chinese Patent Application No. 202211218829.X, filed on Oct. 7, 2022, the entire contents of which are incorporated herein by reference.

TECHNICAL FIELD

The present application relates to a task scheduling method based on an improved particle swarm optimization algorithm, and belongs to the field of task scheduling technology.

BACKGROUND

How to optimally complete the task scheduling is a non-deterministic polynomial (NP) complete problem, and for this kind of task scheduling problem, the solution cannot be get in polynomial time, so researchers at home and abroad have proposed heuristic algorithms, such as a particle swarm optimization algorithm, a cuckoo search algorithm, a genetic algorithm, etc., which are common heuristics. The particle swarm optimization algorithm is a stochastic and parallel optimization algorithm with the advantages of simple algorithm and fast convergence, which is applied to task scheduling by many scholars. Although the traditional particle swarm optimization algorithm has a fast convergence speed in the early iteration, it has insufficient local search capability in the late iteration and is easily caught in the dilemma of local optimal solutions. However, due to the characteristics of the particle swarm optimization algorithm, i.e., the movement of particles is limited by the global optimal solution and the local optimal solution, the algorithm itself does not have the ability to jump out of the local optimal solution.

The information disclosed in this background is intended only to understand the general background of the present application and should not be considered as an admission or in any way implying that the information constitutes related art already known to those skilled in the art.

SUMMARY

The purpose of the present application is to overcome the deficiencies in the related art and provide a task scheduling method based on an improved particle swarm optimization algorithm, which introduces a cuckoo search algorithm when the particle swarm optimization algorithm falls into a local optimal solution, solving the dilemma of the particle swarm optimization algorithm falling into a local optimal solution, while improving the global search capability of the algorithm.

In order to achieve the above purpose, the present application adopts the following technical solution:
a task scheduling method based on an improved particle swarm optimization algorithm, including:
obtaining task data to be scheduled, encoding particles according to the task data;
iterating the particles by a particle swarm optimization algorithm;
in response to that the particle swarm optimization algorithm does not fall into a local optimal solution, outputting a scheduling scheme; and
in response to that the particle swarm optimization algorithm falls into the local optimal solution, outputting the scheduling scheme by fusing the particle swarm optimization algorithm with a cuckoo search algorithm.

In an embodiment, the task data includes a number of tasks and a number of processing nodes;
the particles are encoded by:

$$P_i = \{p_{i1}, p_{i2}, \ldots, p_{ij}, \ldots, p_{in}\},$$

where $P_i$ is an encoding of an ith particle, $p_{ij}$ represents a processing node to which a jth task in an ith scheduling scheme is scheduled, n is the number of tasks, and n is greater than or equal to 1 and less than or equal to N. N is a size of a particle population; $p_{ij}$ is greater than or less than 0 and less than or equal to m when initialization; m is the number of processing nodes.

In an embodiment, determining whether the particle swarm optimization algorithm falls into the local optimal solution includes:
obtaining a change amount of each particle and an average change amount of all particles at one iteration, to obtain a variance value of change amount of all particles at this iteration;
sorting the particles in ascending order according to iterative variation, selecting and calculating a variance value of change amount of first X particles; and
comparing the variance value of the change amount of all particles with the variance value of the change amount of the first X particles;
in response to that the variance value of the change amount of all particles is greater than the variance value of the change amount of the first X particles, the particle swarm optimization algorithm is determined to fall into the local optimal solution; and
in response to that the variance value of the change amount of all particles is not greater than the variance value of the change amount of the first X particles, the particle swarm optimization algorithm is determined to not fall into the local optimal solution.

In an embodiment, the variance value of the change amount of all particles is expressed by:

$$s_a^2 = \frac{\sum_{i=1}^{N}(\Delta P_i^t - \Delta P^t)^2}{N},$$

where $s_a^2$ is the variance value of the change amount of all particles for a tth iteration, $\Delta P_i^t$ is the change amount of each particle in the tth iteration, and $\Delta P^t$ is the average change amount of all particles in the tth iteration.

In an embodiment, the variance value of the change amount of the first X particles is expressed by:

$$s_p^2 = \frac{\sum_{i=1}^{X}(\Delta P_i^t - \Delta P^t)^2}{n},$$

wherein $s_p^2$ is the variance value of change amount of the tth first X particles, $\Delta P_i^t$ is the change amount of each particle in the tth iteration, and $\Delta P^t$ is the average change amount of all particles in the tth iteration.

In an embodiment, the fusing the cuckoo search algorithm with the particle swarm optimization algorithm includes:

using a part of the first X particles as an initial solution of the cuckoo search algorithm, and iterating by the cuckoo search algorithm to obtain an optimal scheduling scheme of the cuckoo search algorithm;

removing the part of the first X particles from an original particle swarm optimization algorithm and randomly generating particles in a same number as the part of the first X particles; and continuing to iterate by the particle swarm optimization algorithm to obtain an optimal scheduling scheme of the particle swarm optimization algorithm.

In an embodiment, the fusing the cuckoo search algorithm with the particle swarm optimization algorithm further includes:

comparing a fitness of the optimal scheduling scheme of the cuckoo search algorithm and a fitness of the optimal scheduling scheme of the particle swarm optimization algorithm; and outputting an optimal scheduling scheme with a higher fitness.

Compared with the related art, the beneficial effect achieved by the present application:

A task scheduling method based on an improved particle swarm optimization algorithm of the present application introduces a cuckoo search algorithm when the particle swarm optimization algorithm falls into the local optimal solution, solving the dilemma of the particle swarm optimization algorithm falling into the local optimal solution, while improving the global search capability of the algorithm.

The present application determines whether the particle swarm optimization algorithm falls into the local optimal solution by setting a particle iteration step threshold, and jumps out of the local optimal by subsequent steps, to obtain a better global optimal solution.

DETAILED DESCRIPTION OF THE EMBODIMENTS

The present application is further described below in conjunction with the accompanying drawings. The following embodiments are used only to illustrate the technical solutions of the present application more clearly and cannot be used to limit the scope of the present application.

EMBODIMENTS

The embodiment provides a task scheduling method based on an improved particle swarm optimization algorithm, which includes:

obtaining task data to be scheduled, encoding particles according to the task data.

iterating the particles by a particle swarm optimization algorithm. If the particle swarm optimization algorithm does not fall into a local optimal solution, the scheduling scheme is output directly; if the particle swarm optimization algorithm falls into the local optimal solution, the particle swarm optimization algorithm is used to fuse the cuckoo search algorithm to output the scheduling scheme.

The technical idea of the present application is to introduce the cuckoo search algorithm when the particle swarm optimization algorithm falls into the local optimal solution, solving the dilemma of the particle swarm optimization algorithm falling into the local optimal solution, while improving the global search ability of the algorithm.

Figure 1:
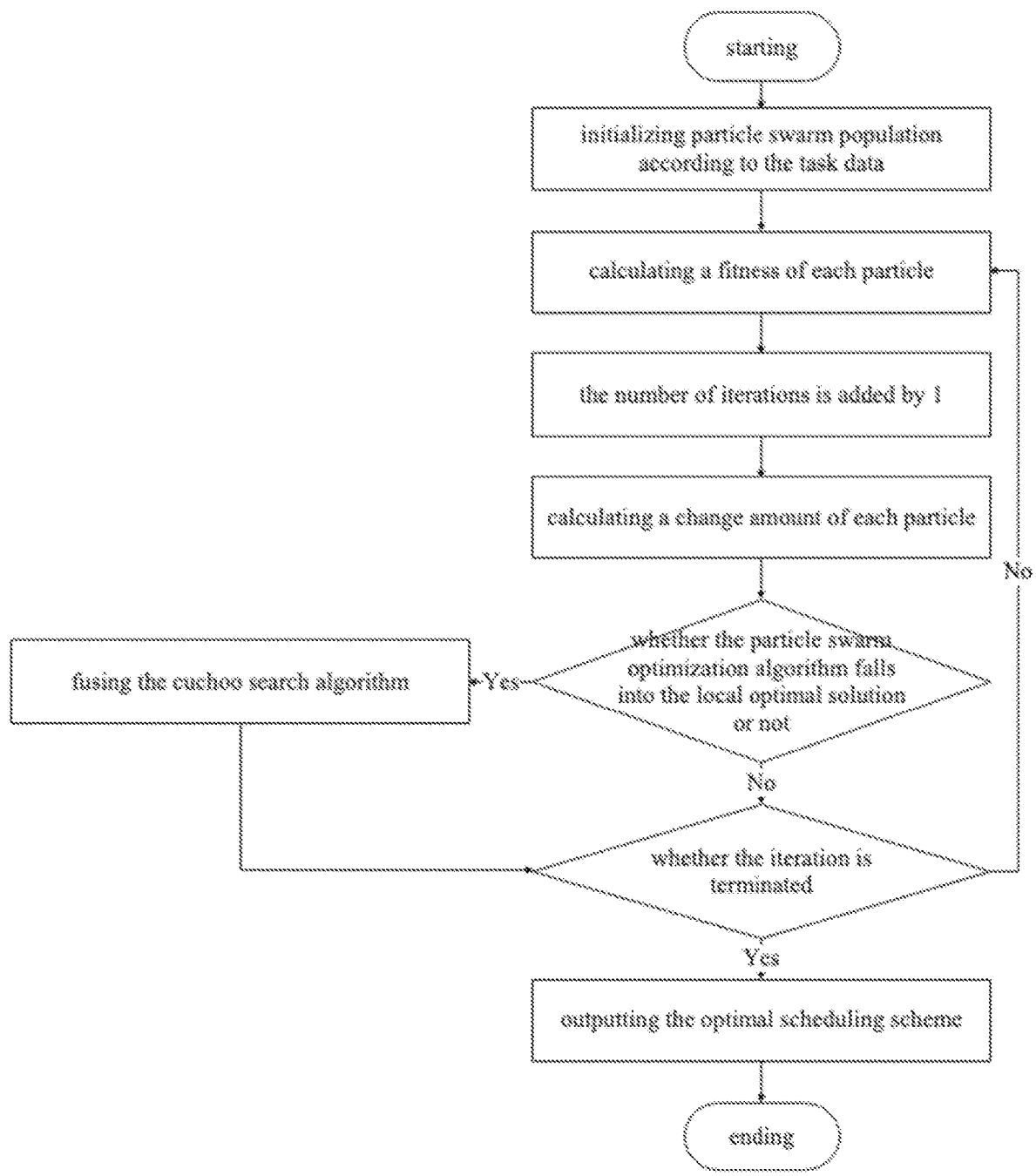
FIG. 1 is a flowchart of a task scheduling method based on an improved particle swarm optimization algorithm.
Figure 2:
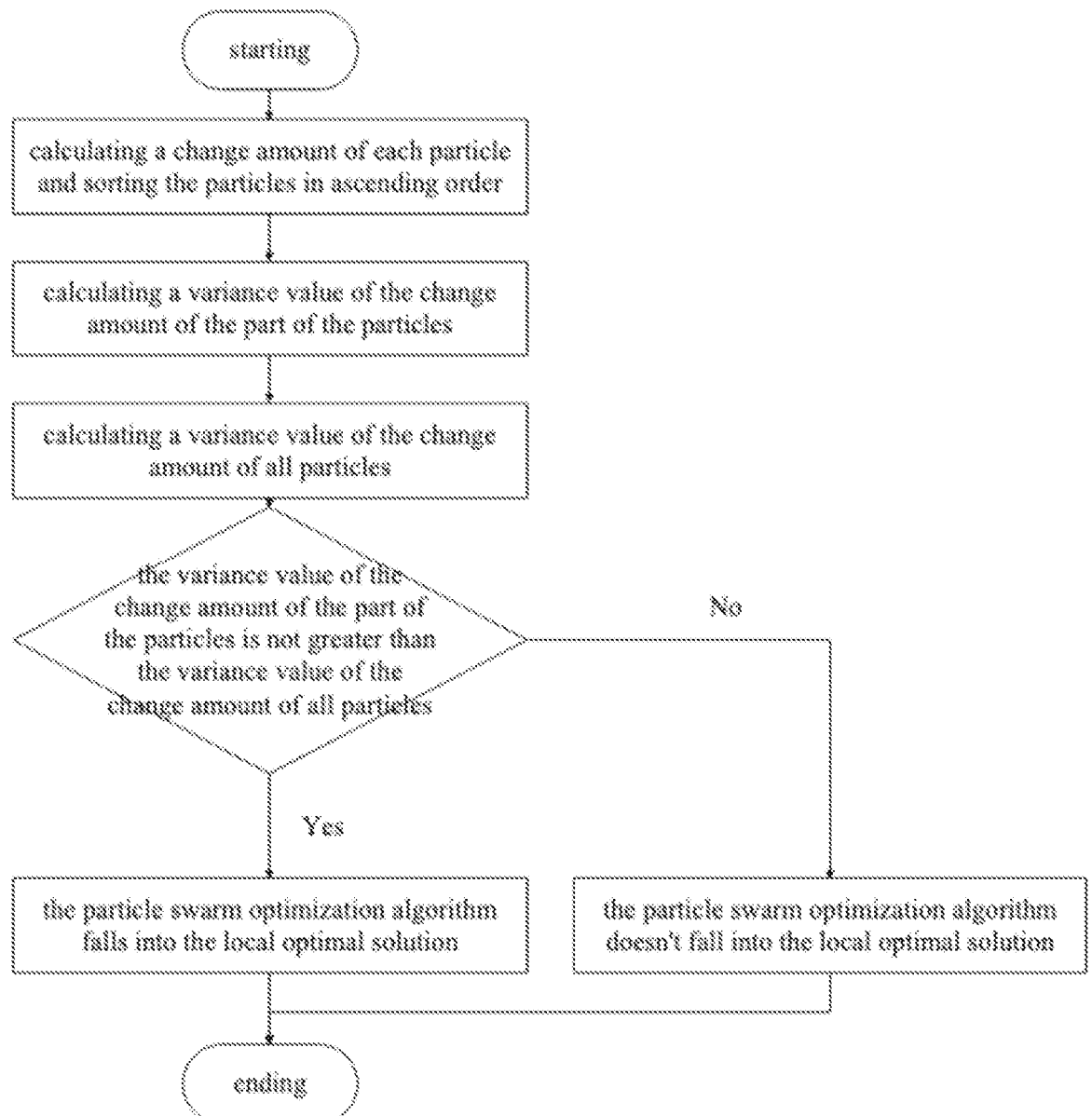
FIG. 2 is a flowchart for determining whether a particle swarm algorithm falls into a local optimum solution.
Figure 3:
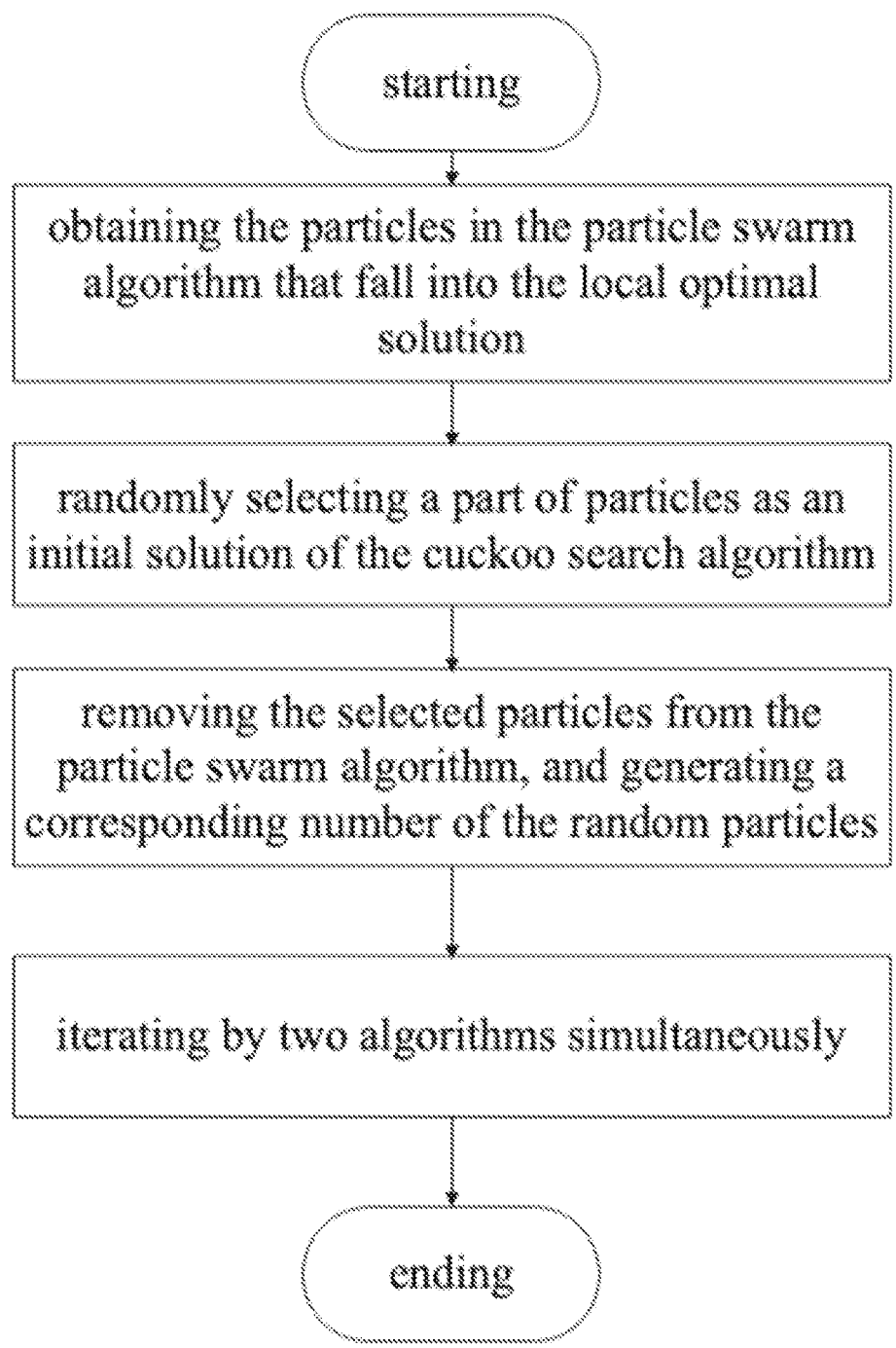
FIG. 3 is a flowchart of fusing a cuckoo search algorithm.

The specific steps am shown in FIGS. 1 to 3:

Step 1: obtaining task data to be scheduled, and encoding particles according to the task data.

The particle swarm population is initialized according to the task data, the particles are encoded according to the tasks to be scheduled, the dimension of the particles is the number of tasks, and each particle represents a task scheduling scheme; there are n tasks, m processing nodes, and a size of the particle population is N, and the encoding of the ith particle can be represented by the following vector:

$$P_i = \{p_{i1}, p_{i2}, \ldots, p_{ij}, \ldots, p_{in}\},$$

where $P_i$ is an encoding of an ith particle, $p_{ij}$ represents a processing node to which a jth task in an ith scheduling scheme is scheduled, n is the number of tasks, and n is greater than or equal to 1 and less than or equal to N, N is a size of a particle population; $p_{ij}$ is greater than or less than 0 and less than or equal to m when initialization; m is the number of processing nodes.

Step 2: calculating a fitness of each particle.

The fitness value of each particle is calculated according to the fitness function, and the global optimal solution and the local optimal solution of each particle in the particle population are recorded.

The specific fitness formula depends on the specific problem to be solved, for example, if cpu and memory are considered, the formula is $$f(x) = \min \Sigma_{i=1}^{N}(C_i + M_i).$$

where $f(x)$ is a fitness of the ith particle, $C_i$ is the usage of CPU of the ith particle, and $M_i$ is the usage of the memory of the ith particle.

It should be noted that the global optimal solution is for all particles, the best result calculated by the fitness function for all particles in all iterations for all particles is unique when the global optimal; the local optimal solution is for the single particle, the best result calculated by the fitness function for a single particle in all its iterations has its own local optimal for each particle.

Step 3: updating a position of each particle.

The number of iterations is added by 1. According to the iterative formula of the particle swarm optimization algorithm, the moving speed of each particle is calculated and the position of the particle is updated. The specific expression is as follows:

$$V_i^{t+1} = \omega V_i^t + c_1 r_1 (P_i^t - X_i^t) + c_2 r_2 (G^t - X_i^t),$$

where $V_i^{t+1}$ is the velocity of the ith particle at the t+1st time. $V_i^t$ is the velocity of the ith particle at the tth time, $X_i^t$ is the position of the ith particle at the tth time, $P_i^t$ is the local optimal solution of the ith particle at the tth time, $G_t$ is the global optimal solution of the ith particle at the tth time, $\omega$ is the inertia weight factor, $r_1$, $r_2$ are a random number from 0 to 1, and $c_1$, $c_2$ are the learning factor.

Step 4: determining whether the particle swarm optimization algorithm falls into the local optimal solution or not.

As shown in FIG. 2, the iterative position of each particle is recorded, i.e., the vector $P_i$, and the change amount $\Delta P_i^t = |P_i^t - P_i^{t-1}|$ of the particle $P_i$ in the tth iteration and the average change amount $$\Delta P^t = \frac{\sum_i^N \Delta P_i^t}{N}$$

of the tth particle are calculated, then the variance value of the change amount of all particles in the tth iteration is $$s_a^2 = \frac{\sum_{i=1}^N (\Delta P_i^t - \Delta P^t)^2}{N}.$$

Then the particles are sorted in ascending order according to the size of the iterative change amount of the particle's vector, the first X particles are selected, and the variance value $$s_p^2 = \frac{\sum_{i=1}^X (\Delta P_i^t - \Delta P^t)^2}{n}$$

of the iterative change amount of the first X particles' vectors is calculated, if $s_p^2 < s_a^2$, it means that the first X particles are more aggregated, the particle swarm optimization algorithm can be determined to fall into the local optimal solution. If the algorithm is determined to fall into the local optimal solution, the step 5 is executed; otherwise, the step 6 is executed;

Step 5: fusing the cuckoo search algorithm.

As shown in FIG. 3, a part of the first X particles in step 4 are used as the initial solution of the cuckoo search algorithm, which is iterated by the cuckoo search algorithm.

The part of the first X particles are removed from an original particle swarm optimization algorithm, and the same number of particles as the part of the first X particles are randomly generated and continue to be iterated by the particle swarm optimization algorithm.

The expression of the cuckoo search algorithm is as follows:

$$X_i^{t+1} = X_i^t + \alpha \otimes L(\lambda)$$

where $X_i^{t+1}$ is the position vector of the ith particle at t+1st time, $X_i^t$ represents the position vector of the ith particle at tth time, $\alpha$ is a constant greater than 0, $\otimes$ is a point-to-point multiplication, and $L(\lambda)$ is a Lévy continuous jump path.

When the particle swarm optimization algorithm falls into the local optimal solution, the algorithm itself does not have the ability to jump out of the local optimal solution due to the characteristics of the algorithm, i.e., the movement of particles is limited by the global optimal solution and the local optimal solution. The traditional operation method of the fused cuckoo search algorithm is that the particles after the iteration of the particle swarm optimization algorithm are directly used as the initial solution of the cuckoo search algorithm for iteration, or the step control in the iteration process of the cuckoo algorithm is modified, such that the overall iteration time is long and the algorithm is inefficient. Therefore, the present application improves the global search capability of the algorithm by fusing the cuckoo search algorithm and dividing the particles into two parts, which are calculated by the particle swarm optimization algorithm and the cuckoo search algorithm, respectively.

Step 6: determining whether the iteration is terminated.

If the iteration termination condition is reached, the calculation is finished, and the optimal scheduling scheme of the cuckoo search algorithm and the optimal scheduling scheme of the particle swarm optimization algorithm are output respectively, and step 7 is executed, otherwise step 2 is executed.

The iteration termination condition in the embodiment is to reach the preset number of iteration termination.

Step 7: outputting the scheduling scheme.

By comparing the fitness function values of the optimal scheduling scheme of the particle swarm optimization algorithm and the cuckoo search algorithm, the final output scheduling scheme is the scheduling scheme with a higher fitness function value between them. The specific formula of the fitness is described in step 2 above.

In summary, for the problem that the traditional particle swarm optimization algorithm does not have enough local search ability in the late iteration stage and easily falls into the local optimal solution, the present application determines whether the algorithm falls into the local optimal solution by setting the particle iteration step threshold, and introduces the cuckoo search algorithm when the particle swarm falls into the local optimal solution, and uses the part of particles that fall into the local optimal solution as the initial solution of the cuckoo search algorithm, and the two parts of particles are solved by the particle swarm optimization algorithm and the cuckoo search algorithm, respectively, which improves the global search capability of the algorithm.

Those skilled in the art should understand that embodiments of the present application may be provided as methods, systems, or computer program products. Thus, the present application may take the form of an entirely hardware implementation, an entirely software implementation, or an implementation combining software and hardware. Further, the present application may take the form of a computer program product implemented on one or more computer-usable storage media (including, but not limited to, disk memory, CD-ROM, optical memory, etc.) containing computer-usable program code therein.

The present application is described with reference to flowcharts and/or block diagrams of methods, devices (systems), and computer program products according to embodiments of the present application. It is to be understood that each process and/or box in the flowchart and/or block diagram, and the combination of processes and/or boxes in the flowchart and/or block diagram, may be implemented by computer program instructions. These computer program instructions may be provided to a processor of a general-purpose computer, a specialized computer, an embedded processor, or other programmable data processing device to produce a machine, such that instructions executed by the processor of the computer or other programmable data processing device produce a device for implementing a function specified in one or more processes of the flowchart and/or one or more boxes of the block diagram.

These computer program instructions may also be stored in a computer readable memory capable of directing the computer or other programmable data processing apparatus to operate in a particular manner, such that the instructions stored in the computer readable memory produce an article of manufacture comprising an instruction device that implements the function specified in the flowchart one process or a plurality of processes and/or the block diagram one box or a plurality of boxes.

These computer program instructions may also be loaded onto a computer or other programmable data processing device such that a series of operational steps are executed on the computer or other programmable device to produce computer-implemented processing, such that the instructions executed on the computer or other programmable device provide steps for implementing the functions specified in the flowchart one process or a plurality of processes and/or the block diagram one box or a plurality of boxes.

The above described is only an embodiment of the present application, and it should be noted that for those skilled in the art, a number of improvements and embellishments may be made without departing from the principles of the present application, and these improvements and embellishments shall also be considered within the scope of the present application.

What is claimed is:

1. A task scheduling method based on an improved particle swarm optimization algorithm, comprising:
    obtaining task data to be scheduled, encoding particles according to the task data;
    iterating the particles by a particle swarm optimization algorithm;
    in response to that the particle swarm optimization algorithm does not fall into a local optimal solution, outputting a scheduling scheme; and
    in response to that the particle swarm optimization algorithm falls into the local optimal solution, outputting the scheduling scheme by fusing the particle swarm optimization algorithm with a cuckoo search algorithm,
    wherein the task data comprises a number of tasks and a number of processing nodes;
    the particles are encoded by:

$$P_i = \{p_{i1}, p_{i2}, \ldots, p_{ij}, \ldots, p_{in}\},$$

wherein $P_i$ is an encoding of an ith particle, $p_{ij}$ represents a processing node to which a jth task in an ith scheduling scheme is scheduled, n is the number of tasks, and n is greater than or equal to 1 and less than or equal to N, N is a size of a particle population; $p_{ij}$ is greater than or less than 0 and less than or equal to m when initialization; m is the number of processing nodes,
    wherein determining whether the particle swarm optimization algorithm falls into the local optimal solution comprises:
    obtaining a change amount of each particle and an average change amount of all particles at one iteration, to obtain a variance value of change amount of all particles at this iteration;
    sorting the particles in ascending order according to iterative variation, selecting and calculating a variance value of change amount of first X particles; and
    comparing the variance value of the change amount of all particles with the variance value of the change amount of the first X particles;
    wherein in response to that the variance value of the change amount of all particles is greater than the variance value of the change amount of the first X particles, the particle swarm optimization algorithm is determined to fall into the local optimal solution; and
    in response to that the variance value of the change amount of all particles is not greater than the variance value of the change amount of the first X particles, the particle swarm optimization algorithm is determined to not fall into the local optimal solution,
    wherein the fusing the cuckoo search algorithm with the particle swarm optimization algorithm comprises:
    using a part of the first X particles as an initial solution of the cuckoo search algorithm, and iterating by the cuckoo search algorithm to obtain an optimal scheduling scheme of the cuckoo search algorithm;
    removing the part of the first X particles from an original particle swarm optimization algorithm and randomly generating particles in a same number as the part of the first X particles; and
    continuing to iterate by the particle swarm optimization algorithm to obtain an optimal scheduling scheme of the particle swarm optimization algorithm.

2. The task scheduling method based on the improved particle swarm optimization algorithm according to claim 1, wherein the variance value of the change amount of all particles is expressed by:

$$s_a^2 = \frac{\sum_{i=1}^{N}(\Delta P_i^t - \Delta P^t)^2}{N},$$

wherein $s_a^2$ is the variance value of the change amount of all particles for a tth iteration, $\Delta P_i^t$ is the change amount of each particle in the tth iteration, and $\Delta P^t$ is the average change amount of all particles in the tth iteration.

3. The task scheduling method based on the improved particle swarm optimization algorithm according to claim 1, wherein the variance value of the change amount of the first X particles is expressed by:

$$s_p^2 = \frac{\sum_{i=1}^{X}(\Delta P_i^t - \Delta P^t)^2}{n},$$

wherein $s_p^2$ is the variance value of change amount of the tth first X particles, $\Delta P_i^t$ is the change amount of each particle in the tth iteration, and $\Delta P^t$ is the average change amount of all particles in the tth iteration.

4. The task scheduling method based on the improved particle swarm optimization algorithm according to claim 1, wherein the fusing the cuckoo search algorithm with the particle swarm optimization algorithm further comprises:
    comparing a fitness of the optimal scheduling scheme of the cuckoo search algorithm and a fitness of the optimal scheduling scheme of the particle swarm optimization algorithm; and
    outputting an optimal scheduling scheme with a higher fitness.

* * * * *